March 20, 1951     J. C. RICHARDSON     2,545,930
PIPE CONNECTOR
Filed Oct. 8, 1946     2 Sheets-Sheet 1
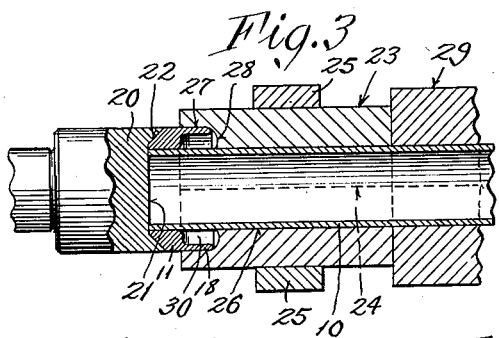
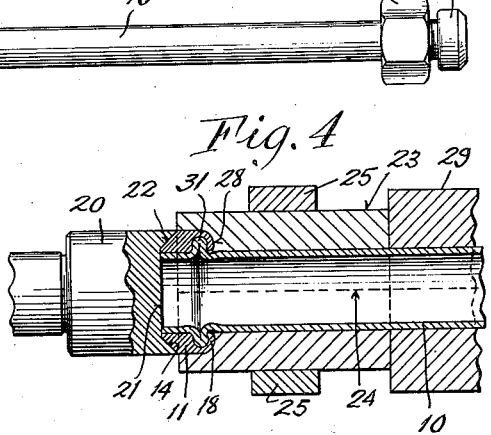
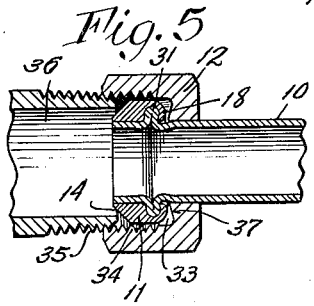
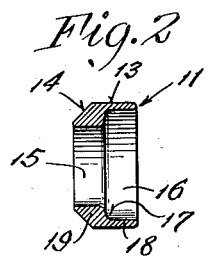
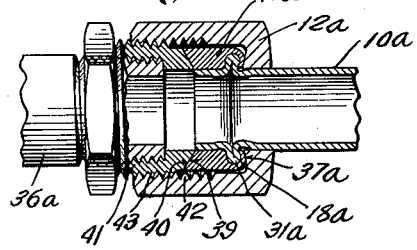
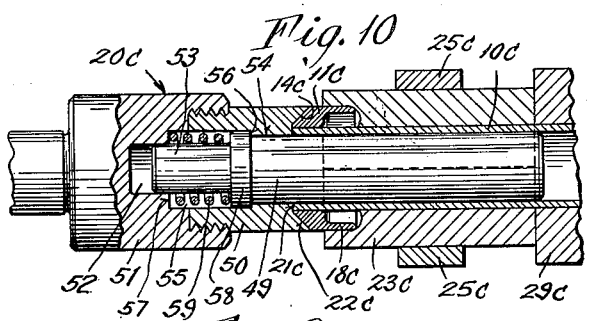
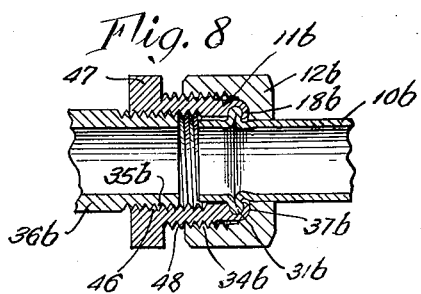
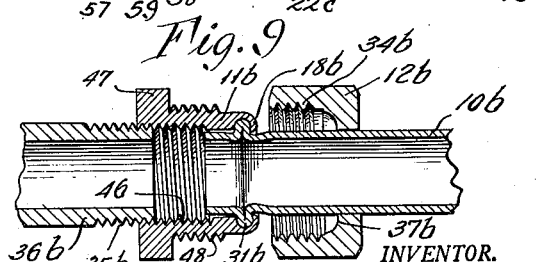
INVENTOR.
James C. Richardson
BY
Johnson, Kline and Hensel
ATTORNEYS March 20, 1951  J. C. RICHARDSON  2,545,930
PIPE CONNECTOR Filed Oct. 8, 1946  2 Sheets-Sheet 2

INVENTOR.
James C. Richardson
BY
Johnson, Kline and Hensel
ATTORNEYS

Patented Mar. 20, 1951

2,545,930

UNITED STATES PATENT OFFICE 2,545,930

PIPE CONNECTOR

James C. Richardson, Utica, N. Y., assignor to The Brockway Company, Naugatuck, Conn., a corporation of Connecticut Application October 8, 1946, Serial No. 702,026

9 Claims. (Cl. 285—87)

This invention relates to connecting means for connecting ductile pipe, tubes, conduits and the like, particularly threadless pipe, to other structures such as conventional threaded pipe or fitting therefor.

The need for convenient and satisfactory means for connecting ductile or bendable threadless pipe or tubing e. g. of metals such as aluminum, copper, lead, tin, zinc, iron and alloys of these metals as well as of ductile plastic materials, rubber and the like to pipe lines, conduits, and orifices of gas or water lines, engines, machines, and commercial or household fixtures having conventional threaded pipe connections or fittings, has been of long standing. For example, one field of application for such connections lies in the use of bendable threadless pipe for connecting household fixtures, such as gas ranges and washing machines, which are to be semi-permanently installed, to existing pipe lines carrying gas, water and the like, wherein the bendable pipe must be connected to conventional threaded pipe fittings.

Various proposals have been made in an attempt to satisfy this need. One type of connection heretofore proposed is one in which the bendable or ductile pipe has its end pre-flared to fit a conical projection on a connector fitting which includes an internally or externally threaded portion adapted to engage conventional pipe threads, and the flared portion of the pipe is clamped against said conical projection by a nut or similar draft member having a clamping surface conforming to the outside of the flared portion of the bendable pipe, and draft means securing it to the connector fitting. Connector means of this type have the disadvantage that the connector member must be provided not only with a conical clamping surface for the flared portion of the tubing, but in addition two separate threaded portions, one for engaging the threads of the clamping member or nut, and the other for engaging the pipe threads of a conventional threaded pipe fitting, thus rendering manufacture of the parts relatively complicated and expensive. Moreover, before installation, the connector member is separate or removable from the bendable tubing, and the nut carried thereby, and is likely to become lost during shipment, storage or handling. The flared end of the bendable tubing is subject to injury during shipment, handling or storage, and may thereby be rendered incapable of forming a leak-tight joint. When such a connection is made up, the flared portion of the pipe, clamped between conical surfaces is subject to withdrawal therefrom upon application of excessive force in longitudinal or lateral direction, or upon continued vibration applied to the pipe, thus tending to cause leakage at the connection.

In accordance with my invention, these difficulties are substantially eliminated. Thus, in one form of my invention, I provide means for securing threadless bendable pipe to other structures, particularly threaded pipe, wherein the bendable pipe has a connector member hereinafter called "a ferrule," engaging a conventional threaded pipe fitting in sealing relation, and firmly secured to the end of the tubing by upsetting the walls of the tubing and enclosing the upset portion within the ferrule. A draft member such as a nut is provided, engaging either the threaded pipe fitting, or the ferrule, and cooperating with said ferrule to seal the junction therewith the bendable pipe. Moreover, when the draft member engages the threaded pipe fitting, to which the bendable pipe is to be secured, the draft member also clamps the ferrule in sealing relation to the threaded pipe fitting, so that only a single draft means is required. However, if desired, the ferrule may have draft means for securing it to the threaded pipe fitting, and separate draft means for engaging the nut.

The ferrule, in accordance with my invention, is secured to the end of a length of bendable pipe by expanding or upsetting a portion of the walls of the pipe adjacent an end thereof to form an external annular ridge of substantially larger diameter than that of the pipe and enclosing this upset portion in a conforming annular space in the ferrule, the resulting interengagement of the ferrule with the upset portion of the pipe holding the pipe and ferrule securely together, independently of any clamping action applied thereto. This connection, particularly when axially clamped, prevents relative axial or lateral movement of the pipe relative to the ferrule.

Thus, a length of bendable pipe carrying the connecting means of my invention can be secured to any conventional pipe fitting merely by attaching the draft member or the ferrule, as the case may be, to a conventional threaded pipe fitting; and tightening the draft member against the ferrule.

The draft member, usually a hollow internally threaded nut, encircles the bendable pipe behind the ferrule, and constitutes the only loose fitting of the combination prior to its installation. When ferrules are carried at both ends of a length of bendable pipe, the ferrules effectively prevent loss of the draft members, since the latter cannot be removed from either end of the pipe section.

In one type of such connections, I provide a ferrule of ductile material, particularly of metal or an alloy, having a convex conical or rounded surface on its outer end adapted to form a seal with the edges of the orifice, at the end of a conventional threaded pipe fitting when clamped against the orifice thereof. In another type of such connections the ferrule may have an outer end surface adapted to abut and conform to a sealing surface on the end of a conventional threaded pipe fitting, such as the male end of a pipe union. In both of these forms of the invention, the draft member carried by the bendable pipe behind the ferrule advantageously comprises threads for engaging corresponding threads on the conventional threaded pipe length or fitting, whereby the draft member nut is adapted to clamp the ferrule against the orifice of the conventional pipe fitting, the connecting means thus having only one set of threads on the draft member. Manufacture of the connector parts is thereby greatly simplified and the cost thereof is greatly reduced as compared with constructions heretofore proposed.

In another embodiment of my invention, the outer end of the ferrule may be provided with means such as internal or external threads for attaching the same to a conventional threaded pipe fitting, and having other threads for engaging the draft member or nut.

In either case, the draft member is adapted when tightened during installation of the connection to apply axial clamping force to the ferrule, and thus clamps the ferrule against the upset annular ridge of the bendable pipe, insuring leak-tight engagement between the ferrule and the bendable pipe.

My invention further comprises the method and apparatus for upsetting the bendable pipe, and enclosing the upset portion thereof within the ferrule. Thus, in accordance with my invention, this is accomplished by constructing a ferrule having a bore extending toward its outer or forward end, having a diameter substantially the same as the outside diameter of the bendable pipe to which it is to be secured. In addition, the ferrule has a counterbore of larger internal diameter than the bendable pipe, entering the ferrule from its inner or rearward end. The walls of the ferrule surrounding the counterbore form a bendable annular flange which encircles a length of bendable pipe inserted into the bore of the ferrule in radially spaced relation.

In order to secure the ferrule to the end of the bendable pipe, the latter is first inserted in the bore of the ferrule with the annular flange, formed by a counterbore, extending rearwardly along the pipe. The ferrule and the end of the pipe are then supported on a suitable abutment, and the rearwardly extending annular flange together with a portion of the pipe extending rearwardly therefrom are enclosed in a die having an annular space in the end thereof for receiving the flange of the ferrule, said annular space terminating at a cam surface adapted to guide and bend the ferrule flange inward toward the pipe when the die is forced toward the aforesaid abutment. Preferably, a mandrel is inserted into the end of the pipe, extending beyond the ferrule, to prevent inward flexure of the walls of the pipe. The pipe together with the die are then forced toward the supporting abutment, causing the walls of the pipe to upset into the annular space formed by the counterbore of the ferrule, while the die simultaneously bends the ferrule flange inward around the annular ridge formed by the upset walls of the pipe, and finally clamps the flange firmly against said ridge. The axial force applied to the pipe for upsetting the same in the aforesaid manner is conveniently applied by frictionally gripping the pipe for a substantial length thereof beyond the end of the ferrule flange and applying axial force to the gripping member in the direction of the supporting abutment. Such gripping force can best be applied by the die. In order to support the walls of the pipe against collapse by said gripping force, the mandrel, hereinbefore referred to advantageously extends into the pipe along the portion subjected to gripping action.

In another form of my invention, the ferrule hereinbefore referred to is omitted, and the end of the pipe is upset in the same manner without enclosing the upset portion thereof within a ferrule. In this construction, the upset portion of the pipe serves the same purpose as the ferrule which encloses the upset portion in the construction hereinbefore described. A draft member, placed on the pipe behind the upset portion, is adapted, when tightened on a threaded fitting (for example, a conventional pipe fitting), to clamp the upset portion of the pipe in sealing relation against the end surface or edge of an orifice in said fitting. If desired, a ferrule can be placed on the pipe in front of the draft member and behind the upset portion of the pipe, to provide more uniform clamping action against the rear surface of the upset portion at the end of the pipe, when the draft member is tightened.

This form of my invention is particularly advantageous in cases where it is desirable (for example, in order to avoid corrosion) to have the metal of the pipe clamped in sealing contact with the fitting to which it is secured. Thus, containers such as kettles often have a protective lining which extends through an orifice and over the end surface of a threaded fitting on the vessel, and the pipe is made of material similar to the lining of the vessel in order to withstand the corrosive effect of the vessel's contents. Where corrosion-resistant ductile pipe is to be attached to such a fitting, it is necessary to clamp the end of the pipe itself in sealing relation to the lining material on the surface of the threaded fitting, in sealing relation, without interposing any foreign material such as the metal of a ferrule. The latter form of my invention is particularly adapted in such case to form a tight seal directly between the connector surface covered with said lining material and the material of the pipe.

In order to form an upset portion on the end of a pipe for the purposes of the second form of my invention, just discussed, a similar method is employed to that disclosed above for enclosing the upset portion within a ferrule. Thus, means such as a die is provided for confining the walls of the bendable pipe along a length thereof extending inward from a point spaced a short distance from the end of the pipe, and for applying pressure in axial direction to the projecting unconfined portion of the pipe, while said end of the pipe is supported against an abutment. The end portion of the die facing said abutment has an annular end cavity, similar in shape to the interior of the ferrule employed in the previously described construction, so that upon application of compressive force the unconfined end portion of the pipe is upset within the end of the die and molded thereby to the desired shape. As before, if both ends of the pipe are upset in this manner, a pair of draft members are placed on the pipe before the second end is upset. If they are to be employed, ferrules adapted to clamp against the rear surface of the upset portions can be placed on the pipe between the ends of the latter and the draft members, so that the latter are adapted to force the ferrules against the rear surfaces of the upset portions on the pipe ends.

The operations involved in upsetting the end portions of a pipe in accordance with my invention, whether enclosed or not within the ferrule, can be conveniently, rapidly and economically carried out successfully on a series of lengths of bendable pipe, with simple and easily manufactured apparatus.

My invention will be more fully understood from the following description of a number of embodiments thereof, taken in conjunction with the accompanying drawings, wherein Figure 1 is a side elevation of a length of ductile bendable pipe carrying connector means in accordance with my invention at both ends thereof.

Fig. 2 is a detail in axial cross-section of a ferrule employed in making the bendable pipe length of Fig. 1.

Figs. 3 and 4 are views partly in axial cross-section illustrating the method of securing the ferrule of Fig. 2, to a length of bendable pipe.

Figs. 5 and 6 are views in axial cross-section of the manner in which the bendable pipe of Fig. 1 is secured to the end of a conventional threaded pipe fitting.

Fig. 7 is a view, partly in axial cross-section, of a modified form of my invention, wherein the ferrule is shaped to form a seal with the male end of a conventional threaded pipe union.

Fig. 8 is a view in axial cross-section of still another modification of my invention wherein the ferrule is threaded to engage a conventional threaded pipe fitting.

Fig. 9 is a view of the modification shown in Fig. 8, during assembly thereof.

Fig. 10 is a view similar to Fig. 3 but showing a modification of the apparatus employed for assembling the ferrule with a bendable pipe.

Figure 15:
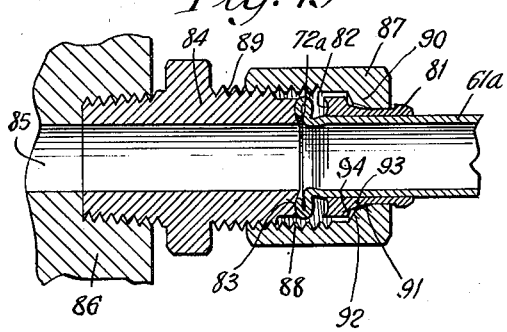
Figure 16:
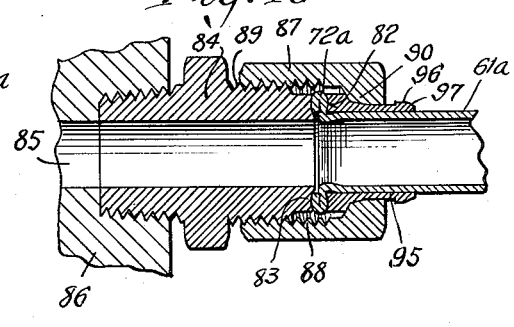

Figs. 15 and 16 are views similar to views 13 and 14 illustrating a modified manner of connecting the upset end of a pipe in accordance with my invention in sealing relation to a threaded structure.

Referring to the drawings, Figure 1 illustrates a length of ductile or bendable pipe 10 having ferrules 11 at opposite ends thereof, and a pair of nuts 12 slidably carried on the pipe between the ferrules. The latter prevent the nuts 12 from sliding off the pipe, thus avoiding any possibility of loss thereof during shipment, handling or storage of the assembly.

Bendable pipe carrying the connector means of my invention as shown in Fig. 1, can be marketed in graduated lengths and sizes adapted for installation as a connection to existing pipe lines, fixtures, and other apparatus with which they are to be used. The pipe 10 can be made of sufficiently flexible material to be readily bent to conform in length and in the orientation of its ends to the structures with which it is to be used. Thus, it can be carried by a workman to the place where it is to be installed and then adjusted for connecting gas ranges, heaters, ovens, dishwashers, laundry machines and the like, to existing gas or water lines.

The tube or pipe 10 can be made of any ductile material, for example, metals and their alloys such as brass, copper, tin, lead, aluminum, zinc, iron and the like, as well as of ductile plastic materials, including for example, rubber and synthetic plastics, the essential requirement being that the material be susceptible to flexure and expansion of the walls thereof, and to the clamping operations hereinafter described, without splitting or other fracture.

The ferrule 11, shown in Fig. 2 prior to its assembly with the bendable pipe 10, is made of ductile metal or alloy, or of plastic material having similar ductile properties. It has an outer cylindrical surface 13 terminating at the outer or forward end of the ferrule at a sealing surface 14 which is convexly conical in the illustrated embodiment, but which may have any other suitable form adapted for engaging the end of a conventional pipe fitting or orifice in sealing relation. Internally, the ferrule 11 has a bore 15, conforming in shape and size or in diameter substantially to the shape and size or diameter of the pipe 10 with which it is to be used so as to permit insertion of the pipe in said bore with the ferrule snugly fitting around the pipe. Extending inward from the rear or inner end, the ferrule includes a counterbore 16 terminating at an annular shoulder 17, preferably having a rounded edge where it joins the walls of the bore 15, and the junction of said shoulder with the walls of the counterbore 16 being preferably filleted. The counterbore 16 forms a cylindrical relatively thin walled flange 18 which encircles the pipe 10 in radially spaced relation thereto, when the end of the pipe is inserted into the bore 15 through the counterbore 16. Beyond the counterbore 16, the end of the pipe 10 is surrounded by a relatively thick walled rigid portion 19 of the ferrule.

In order to assemble the ferrule 11 to the end of the pipe 10 for attachment thereto, the latter is inserted into the bore 15 through the counterbore 16, so that the flange 18 extends rearwardly along the pipe. The outer end of the ferrule, and the end of the pipe 10 are positioned against a supporting abutment member 20, advantageously having an end surface shaped to receive and conform to the end surfaces of the ferrule and pipe. The abutment member 20 constitutes one relatively movable portion of a press, and in the case of the ferrule shown in Figs. 3 and 4, has a cavity in its end surface with a flat central portion 21 abutting the end of the ferrule and pipe, and a conical surface 22 conforming to the conical surface 14 of the ferrule. Flange 18 of the ferrule, and a length of the pipe 10 projecting beyond the flange 18, are enclosed or confined in a die 23, advantageously split longitudinally in two or more parts as indicated by the dotted line 24 so as to permit the die to be laterally applied to and removed from the ferrule and pipe, and further to permit the die to grip the walls of the pipe 10 enclosed thereby upon application of lateral pressure to the clamps 25.

The die 23 has an inner bore 26 conforming to the outer walls of the pipe 10, extending beyond the flange 18 of the ferrule, and a counterbore 27 slidably enclosing the outer cylindrical surface 13 along the exterior of flange 18 of the ferrule. At the inner end of the counterbore 27, an annular shoulder 28 is provided of rounded concave contour so as to provide a camming surface for bending or curling the flange 18 inward toward the pipe 10 when the ferrule is forced into the counterbore 27. At its opposite end, the die 23 is supported by an abutment member 29 which, with abutment member 20, constitutes the other relatively movable member of the press.

In order to secure the ferrule on the end of the pipe 10, the ferrule 11 with the end of the pipe 10 inserted in the bore 15, is seated as shown in Fig. 3, against the end surfaces 21 and 22 of the press member 20; and the die 23 is clamped against the walls of the pipe 10 and ferrule 11 with flange 18 of the ferrule extending preferably as far as possible into the counterbore 27 of the die. Axial pressure is then applied to the ferrule and pipe by forcing the relatively movable members 20 and 29 of the press together, while at the same time maintaining sufficient compression between clamps 25 to cause the die 23 to grip the walls of the pipe 10 frictionally, and move the gripped portion of the pipe together with the die toward the member 20.

The compressive force thus applied to the pipe between the end surface 21 of press member 20 and the shoulder 28 at the inner end of counterbore 27 of the die, causes the walls of the pipe 10 to bulge outward or upset into the annular space 30 between the rounded shoulder 17 of the ferrule and the shoulder 28 of the die, and to form an annular upset ridge 31 on the pipe 10; while at the same time, flange 18 of the ferrule is cammed inward by the shoulder 28 of the die, so that the flange bends inward around the ridge 31 toward the walls of the pipe 10. Finally, the die clamps the ridge 31 between the inwardly bent flange 18 and the shoulder 17 of the ferrule. The length of the flange 18 and thickness of the walls of pipe 10 are preferably such as to cause the upset ridge 31 resulting in the foregoing operation to fill the annular cavity formed by inward flexure of the flange 18 of the ferrule. Thus, when the operation is completed the upset ridge 31 is snugly closed by flange 18, and clamped between said flange and the shoulder 17 in the inner end of the counterbore 16 of the ferrule.

Upon releasing the pressure applied by press members 20 and 29, and clamp members 25, pipe 10 and ferrule 11 are released for removal from the press, with the ferrule securely fastened to the end of the pipe 10 in such a manner as to prevent relative movement between the ferrule and the pipe, to provide a substantially leak-tight joint between the pipe and the ferrule.

In order to connect the resulting assembly to a conventional threaded pipe fitting, a draft member is provided such as the nut 12, impaled on the pipe 10, behind the ferrule, having, for example, a conventional hexagonal or square exterior shape, and having an internal cavity 33, with draft means such as pipe threads 34 extending inward along its walls for engaging corresponding pipe threads 35 on the end of a conventional threaded pipe or nipple 36. Cavity 33 in the nut 12 terminates at shoulder 37 which is adapted to engage and to apply pressure in axial direction to the inwardly bent portion of flange 18 of the ferrule. When a ferrule 11 is secured at both ends of a length of pipe 10, a pair of draft members for cooperation with both ferrules are placed on the pipe before the second ferrule 11 is attached thereto, since thereafter the nuts 12 are prevented from removal from the pipe 10 by the ferrules.

Assembly of the end of pipe 10 with the externally threaded end of the pipe or nipple 36, illustrated in Figs. 5 and 6, involves positioning the conical surface 14 of the ferrule against the orifice at the end of the nipple 36, and threading the nut 12 on to the end of said conventional pipe fitting, until the shoulder 37 by engaging flange 18 of the ferrule forces the sealing surface 14 of the ferrule against the end of the orifice of a pipe. Further tightening of the nut 12 causes the edges of the orifice at the end of the pipe fitting 36 to bite into the sealing surface 14 of the ferrule as indicated at 38 providing a leak-tight seal between the ferrule and the pipe fitting 36. At the same time, shoulder 37 of the nut applies clamping pressure to the inwardly bent portion of flange 18 so as to clamp the flange against the upset ridge 31 of the walls of the pipe, lying between said flange and the shoulder 17 at the inner end of counterbore 16 of the ferrule, thus insuring a leak-tight connection between the ferrule and the pipe 10.

The resulting clamped interengagement of the pipe 10 and the ferrule 11 prevents failure of the joint upon application of lateral or longitudinal force or vibration to the pipe 10. Only a single draft means comprising the threads 34 on the nut 12 is required, thus rendering manufacture of the connector exceedingly simple and economical.

In Fig. 7, I have shown a modification of the connection illustrated in the preceding figures wherein those parts which are similar to the construction described above have the same reference numerals with the postscript "a." Thus, the ferrule 11a is similar to the ferrule 11, hereinbefore described, except that it has a concave conical or rounded surface 39 at its outer end instead of the convex conical sealing surface 14 of ferrule 11. The sealing surface 39 is adapted to seat in surface engagement against a conforming sealing surface 40 on the end of a conventional male union member 41. Moreover, the nut 12a cooperating with the ferrule 11a is provided with internal threads 42 adapted to engage corresponding external threads 43 on the male union member 41. The shoulder 37a at the rear end of the cavity of the nut 12a clamps flange 18a of the ferrule against the upset ridge 31a of the bendable pipe 10a.

Assembly of the ferrule 11a with the pipe 10a can be carried out in the same manner as described in Figs. 3 and 4, the only modification required in the press being the substitution of a convex conical surface on the press member 20 conforming to the concave conical surface 39 of ferrule 11a to replace the surface 22 shown in Fig. 3.

Fig. 8 illustrates a second modification of my invention, wherein the draft member is secured by draft means to the ferrule instead of to the conventional threaded pipe fitting and the ferrule itself is provided with draft means for securing the same to said pipe fitting. In this modification, parts which are similar to those described above are designated by the same reference numerals but with the postscript "b." In this form of the invention, the ferrule 11b extends forwardly from the end of the pipe 10b, and the extending portion comprises draft means such as internal pipe threads 46 adapted to engage corresponding pipe threads 35b on the end of conventional threaded pipe 36b. Externally the ferrule advantageously includes a nut portion 47 of conventional shape or design to facilitate tightening the ferrule 11b on the end of the pipe 36b. Moreover, the ferrule 11b includes draft means such as external threads 48 intermediate its ends for engaging corresponding internal threads 34b on the nut 12b. The latter is otherwise similar to the nuts 12 and 12a. Its clamping surface or shoulder 37b can be formed if desired of rounded contour so as to conform more snugly with the outer surface of the inwardly bent flange 18b.

In assembling this form of connector with the end of a pipe, the ferrule 11b is first threaded on to the end of conventional pipe section 36b and tightened, for example, by applying a wrench to the nut portion 47, until a leak-tight joint is formed between the ferrule and the threaded pipe 36b. The nut 12b is then threaded on to the external threads 48 of the ferrule until its shoulder 37B is tightened against the flange 18b, to clamp the upset portion 31b of pipe 10b firmly within the flange 18b, thus providing a leak-tight seal between the ferrule and the bendable pipe 10b.

Fig. 10 illustrates a modification of the apparatus shown in Figs. 3 and 4 for securing the ferrule 11 to the end of the bendable pipe 10. In this view, reference numerals for similar parts are the same as in Figs. 3 and 4 except that they have the postscript "c." Thus, in this form of apparatus, the pipe 10c, ferrule 11c, die 23c, clamp members 25c, and compression member 29c are all similar to the corresponding parts shown in Figs. 3 and 4. The opposite press member 20c however differs from the member 20 in Figs. 3 and 4 in that it has a mandrel 49 projecting into the pipe 10c, beyond flange 18c, preferably substantially to the full length of the die 23c. The mandrel 49 preserves the internal diameter of the pipe during the upsetting and bending operation of the press. Thus, the press member 20c comprises an end piece 50 threaded into a block 51, the latter having a central bore 52 for receiving and centering a stem 53 on the rear end of the mandrel 49, which projects outward through a central bore 54 in the end piece 50. The latter has a surface 22c for supporting the conical surface 14c of the ferrule 11c, and an annular shoulder 21c abutting the end of the pipe 10c. The block 51 and end piece 50 of the press member have communicating counterbores forming a cylindrical chamber 55 terminating at annular shoulders 56 and 57 at the forward and rearward ends thereof, and the mandrel 49 carries an annular flange 58 slidably movable in said chamber and normally urged by a spring 59 toward the shoulder 56 at the forward end of said chamber.

In assembling the ferrule 11c with the pipe 10c in the apparatus shown in Fig. 10, the pipe 10c carrying the ferrule is passed over the end of mandrel 49 until the ferrule and the end of the pipe are seated against the end surfaces 21c and 22c of the end piece 50. Clamps 25c are applied to apply clamping pressure to the pipe 10c through the die 23c, such pressure being supported by the mandrel 49 lying interiorly of the pipe for the length of the die 23c, and thus preventing collapse of the walls at this point regardless of the pressure applied. It will be observed that the mandrel 49 is thus frictionally clamped between the walls of the pipe 10c, intermediate the ends of the die 23c, so that upon longitudinal movement of the die, the engaged portion of the pipe 10c together with the mandrel 49 move together in the same manner. Thus, upon applying pressure between block 51 and abutment member 29c, the die 23c together with the walls of the pipe 10c engaged thereby and mandrel 49 move inward against the compressive force of spring 59, while stem 53 and flange 58 of the mandrel slide rearwardly in block 52 and chamber 55 respectively.

The walls of the pipe 10c are upset in the same manner as shown in Figs. 3 and 4 and the flange 18c of the ferrule 11c is similarly curled inward around the upset ridge thereby formed. However, the mandrel 49 extending through the upset portion of the pipe 10c also prevents any tendency of the walls of the pipe to constrict during the upsetting operation. When the operation is complete, pressure is released between members 51 and 29c, the die 23c is removed, and the pipe 10c with the ferrule 18c attached thereto is slid off of mandrel 49 which returns to its original position under the force of spring 59. The apparatus shown in Fig. 10 is thus advantageously employed in the case of bendable pipe in which the walls are so thin as to collapse under the pressure applied by the die 23c, or in cases where the walls tend to constrict substantially upon upsetting within the ferrule.

Figure 11:
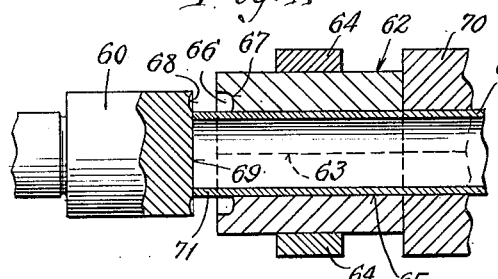
Figs. 11 and 12 are views, partly in axial cross-section, illustrating the method of upsetting the end of a pipe, without enclosing the same within a ferrule, for use as a connector in accordance with my invention.
Figure 12:
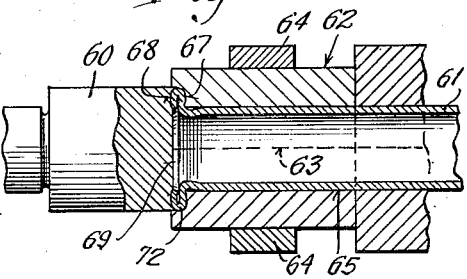

Figs. 11 and 12 illustrate a method of upsetting the end of a piece of ductile pipe in accordance with my invention, without enclosing the upset portion within a ferrule. The apparatus employed comprises an abutment member 60 against which the end of a piece of ductile pipe 61 is supported, said abutment member constituting one relatively movable portion of a press. The length of the pipe 61 is enclosed or confined in die 62 advantageously constructed in longitudinally separable parts as indicated by the dotted line 63, so as to permit the die to be laterally applied to and removed from the pipe, and further to permit the die to grip the walls of the pipe enclosed thereby upon application of lateral pressure to the die by the clamps 64.

The die 62 has an internal bore 65 conforming to the outer walls of the pipe 61, and at the end of the die facing the abutment member 60 is formed an annular rounded cavity 66 terminating at a rounded shoulder 67 of a shape similar to the shoulder 17 on the ferrule shown in Fig. 2. Moreover, the abutment member 60 is advantageously provided on its surface for engaging the end of the pipe 61, with a shallow annular rounded groove 68 surrounding and adjoining the central portion 69 which abuts the end of the pipe. The die 62 is backed by an abutment member 70 which together with the abutment member 60 constitutes the other relatively movable member of the press.

In order to upset the end of the pipe 61, the die 62 is clamped to the walls of the pipe in such a position that an end portion 71 of the pipe, which is to be upset, protrudes beyond the shoulder 67 on the die; and clamping pressure is applied to the clamps 64 to cause the die to grip the pipe frictionally so as to prevent relative movement between the pipe and the die. Abutment member 60 is then brought against the protruding end 71 of the pipe, and the other abutment member 70 is forced against the rear surface of the die 62, thereby subjecting the projecting portion 71 of the pipe to pressure in axial direction. The compressive force thus applied to the end portion 71 of the pipe causes the walls of said portion to bulge outward or to upset into the annular space 66 in the end of the die and into the shallow annular groove 68 in the end surface of the abutment member 60. Finally, the die 62 and abutment member 60 compress the resulting upset portion 72, as shown in Fig. 12, and mold the same to the desired shape. Upon releasing the pressure between abutment members 60 and 70 and between clamp members 64, the pipe 61, carrying upset portion 72 on its end, is released for assembly in a joint.

Figure 14:
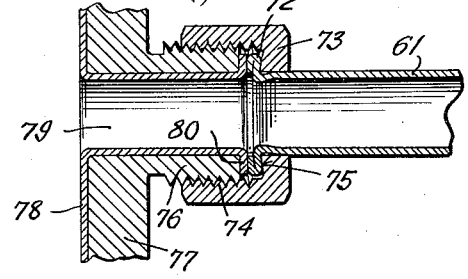

In order to connect the resulting end of the pipe to a conventional threaded structure, a draft member such as the hollow nut 73, placed on the pipe 61 behind the upset end portion 72, and having internal threads 74 and an inner shoulder 75 adapted to clamp against the rear surface of the upset portion 72, is screwed on to a correspondingly threaded structure such as an externally threaded boss 76 on a vessel 77. The vessel has a protective lining 78 extending through an orifice 79 in said boss, and projecting outward in the form of a flange 80 over the end surface of the boss. When the draft member or nut 73 is tightened, as shown in Fig. 14, the shoulder 75 on the nut engages the rear surface of the upset portion 72 on the end of the pipe, and clamps it firmly against the flange 80 of lining 78, extending over the end surface of the boss 76. A leak-tight joint is thus formed between the metal of the pipe 61 and the metal of the lining 78, so that by making the pipe 61 of suitable corrosion-resistant material, for example, of the same material as the lining 78, a corrosion-resistant leak-tight joint is formed at the clamped surfaces.

Figure 13:
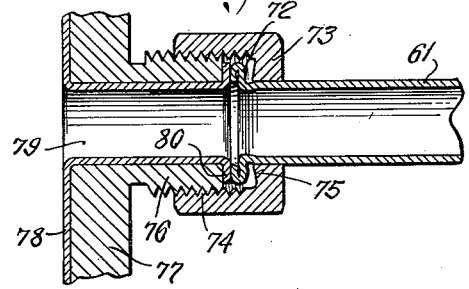
Figs. 13 and 14 are views in axial cross-section of the manner in which the upset end of a pipe, formed as shown in Figs. 11 and 12, is secured to a conventional threaded structure in sealing relation therewith.

A modification of the connector construction shown in Figs. 13 and 14 is illustrated in Figs. 15 and 16, said modification being particularly useful in order to provide a more uniform seal between the upset portion on the end of the pipe and the threaded structure to which it is sealed. This arrangement differs from the construction of Figs. 13 and 14 in that a ferrule 81 is provided surrounding the pipe 61a having an end surface 82 advantageously shaped to conform to the rear surface of the upset portion 72a on the end of the pipe 61a, for example, by having a shallow concave annular groove therein for clamping the upset end 72a of the pipe against a similarly shaped clamping surface 83 on the end of a conventionally threaded member, such as the adaptor 84. The latter in the form illustrated is threaded into an orifice 85 in the wall of a structure 86. A draft member, such as the hollow nut 87, having internal threads 88 for engaging corresponding external threads 89 on the adapter 84 has an inwardly projecting flange 90 adapted to cooperate with the ferrule 81 to advance it toward the upset end 72a of the pipe to clamp the same between the ferrule surface 82 and the end surface 83 of the threaded member 84.

In the form of the invention herein illustrated, the flange 90 has a pair of interior cam surfaces 91 and 92, conical in form, the former diverging relatively gradually from the axis of the nut and the latter diverging at a relatively steep angle thereto. The ferrule 81 has a corresponding pair of cam surfaces 93 and 94 adapted to be engaged by said cam surfaces on the flange 90 when the nut 87 is tightened on the threaded member 84, so as to advance the ferrule against the upset portion 72a at the end of the pipe 61a. As shown in Fig. 16, such action of the nut 87 clamps the upset portion 72a firmly between the surface 82 on the ferrule and the surface 83 on threaded member 84, forming a leak-tight seal between the upset end of the pipe and said threaded member.

Upon application of clamping pressure between the cam surfaces 93 and 94 on the ferrule and corresponding surfaces 91 and 92 on flange 90 of nut 87, said cam surfaces are deformed and virtually ironed out into a substantially rounded form as shown in Fig. 16. The interaction of said camming surfaces moreover tends to constrict the ferrule 81 inward against the pipe 61a, gripping the same firmly and supporting it against lateral forces or vibration applied thereto, supplementing in this respect the clamping action applied by the ferrule 81 to the upset portion 72a at the end of the pipe.

The ferrule 81 preferably has a sleeve 95 extending through the rear end of the nut 87, and terminating in a slightly enlarged flange 96 whereby the nut and ferrule are held together. Assembly of the nut and ferrule is accomplished by forcing the nut over the flange 96, such assembly being facilitated by a chamfer 97 on the rear end of said flange. Thus, the nut 87 and ferrule 81 can be preassembled, and will remain assembled until the joint is made up.

When clamping force is applied between the cam surfaces 91 and 92 on the nut 87, and the corresponding surfaces 93 and 94 on the ferrule 81 the camming action, in addition to applying constricting force to the ferrule, applies expanding force to the flange 90, which, if the force is of sufficient magnitude, deforms said flange and permanently enlarges the aperture at the rear end of the nut, so that the latter can be backed off of the connection without being obstructed by flange 96 on the ferrule. Thus, when it is desired to remove the draft member or nut 87 from the connection to inspect or clean the same, this can be done without disturbing the position of the ferrule on the pipe 61a.

Thus, the forms of the connector constructed in accordance with my invention provide exceedingly economical and highly effective means for connecting a piece of ductile pipe in sealing relation to a conventional threaded structure such as a pipe fitting; if desired, such connection can be made without interposing any foreign material between the material of the pipe and the material constituting the sealing surface of the fitting or structure.

Variations and modifications may be made within the scope of the invention, and portions of the improvements may be used without others.

I claim:

1. Connector means for attaching threadless ductile pipe to another structure, comprising a ferrule encircling said pipe adjacent an end thereof and enclosing an external annular ridge on the pipe, constituted by an upset portion of the walls thereof; means for securing said ferrule to said other structure in sealing relation therewith; and means for clamping said ferrule in axial direction against opposite sides of said annular ridge.

2. Connector means for attaching threadless ductile pipe to another structure, comprising a ferrule encircling said pipe adjacent an end thereof, and having an internal annular space therein, the walls of said pipe being upset within said annular space; means for securing said ferrule to said other structure in sealing relation therewith; and means for clamping said ferrule in axial direction on opposite sides of said annular space to clamp said ferrule against the upset portion of the walls of said pipe.

3. Connector means for attaching threadless ductile pipe to another structure having an orifice therein and draft means adjacent said orifice, comprising a ferrule encircling said pipe adjacent an end thereof and enclosing an annular ridge on the pipe constituted by an upset portion of the walls of the pipe, said ferrule having means for engaging said structure around said orifice in sealing relation; and a draft member for engaging said draft means on said structure, said draft member including means for clamping said ferrule in sealing relation against the orifice of said structure, and for clamping a portion of said ferrule which encloses said annular ridge against the ridge to form a leak-tight connection between the pipe and the ferrule, when the draft member is tightened on the draft means of said structure.

4. Connector means for attaching threadless ductile pipe to another structure, comprising a ferrule encircling said pipe adjacent an end thereof and enclosing an external annular ridge on the pipe constituted by an upset portion of the walls of the pipe; means on said ferrule for securing the same to said other structure in sealing relation therewith; a draft member carried by said pipe behind the ferrule and draft means on said ferrule, said draft member cooperating with said draft means to clamp a portion of said ferrule enclosing said annular ridge against the ridge to form a leak-tight connection between the pipe and the ferrule.

5. Connector means for attaching threadless ductile pipe to another structure having an orifice therein and a threaded portion adjacent said orifice, comprising a ferrule encircling said pipe adjacent an end thereof, said ferrule having at its rearward end a flange enclosing an annular ridge on said pipe, constituted by an upset portion of the walls thereof, and a surface at the forward end of the ferrule for forming a seal with said other structure around the orifice; and a hollow nut slidably carried by said pipe behind the ferrule, having a threaded portion for engaging the threads on said other structure, and an internal shoulder for engaging said flange at the rear end of said ferrule to clamp the flange in sealing relation against said annular ridge, and to clamp said surface at the forward end of the ferrule in sealing relation against said other structure around the orifice therein, when said threaded portions are engaged and tightened.

6. Connector means for attaching threadless ductile pipe to the end of an externally threaded pipe fitting, comprising a ferrule having at its rearward end a flange enclosing an annular ridge on the pipe constituted by an upset portion of the walls of the pipe, and a convex surface at the forward end of said ferrule for engaging the edge of the orifice on said threaded pipe in sealing relation; and a hollow nut slidably carried by said bendable pipe behind the ferrule having interior threads for engaging said threaded pipe fitting, and an interior shoulder for clamping against the ferrule flange to force said convex surface into sealing relation with the edge of said orifice and to clamp the ferrule flange in sealing relation against said annular ridge on the pipe.

7. Connector means for attaching threadless ductile pipe to the end of an externally threaded pipe fitting having a sealing surface adjacent the orifice thereof, comprising a ferrule having at its rearward end a flange enclosing an external annular ridge on the pipe constituted by an upset portion of the walls of the pipe, and a sealing surface at the forward end of said ferrule for surface engagement with the sealing surface on said threaded pipe fitting; a hollow nut slidably carried by said pipe behind the ferrule having interior threads for engaging said threaded pipe fitting; and an interior shoulder for clamping against said ferrule flange to force said sealing surfaces into sealing relation and for clamping said ferrule flange in sealing relation against said annular ridge on the pipe.

8. Connector means for attaching threadless ductile pipe to a threaded pipe fitting comprising a ferrule encircling said pipe adjacent an end thereof and having at its rearward end a flange enclosing an external annular ridge on the pipe constituted by an upset portion of the walls of the pipe, said ferrule having a threaded portion for engaging said threaded pipe fitting in sealing relation therewith; a draft member carried by said pipe behind the ferrule; and draft means cooperating therewith on said ferrule, said draft member having an interior shoulder thereon for clamping against said ferrule flange when said draft member is tightened on the ferrule to clamp the ferrule flange in sealing relation against the annular ridge on the pipe.

9. A ferrule for attachment to the end of a bendable pipe, comprising a bore conforming to the outside surface of the pipe and a counterbore extending partway into said ferrule from an end thereof, and forming a flange adapted to encircle a pipe inserted into the bore of the ferrule in radially spaced relation thereto.

JAMES C. RICHARDSON.

REFERENCES CITED

The following references are of record in the file of this patent:

UNITED STATES PATENTS

| Number | Name | Date |
| --- | --- | --- |
| 1,817,854 | Sorenson | Aug. 4, 1931 |
| 1,878,640 | Miner | Sept. 20, 1932 |
| 1,971,117 | Mossberg | Aug. 21, 1934 |
| 2,131,509 | Goepel et al. | Sept. 27, 1938 |
| 2,382,098 | Robie | Aug. 14, 1945 |
| 2,413,089 | Vaught | Dec. 24, 1946 |